Patented July 6, 1926.

1,591,767

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

USE OF LUBRICANTS IN THE VULCANIZATION OF RUBBER ARTICLES.

No Drawing. Application filed June 9, 1925. Serial No. 36,051.

It has long been recognized that in the vulcanization of rubber articles such as pneumatic tires, there is a tendency for the rubber to adhere to the metallic mold and also a tendency for the tire to "come shy", or incompletely fill out the molding cavity. The latter tendency in particular varies greatly with the form of the article and the composition of which it is made. Where it is possible to change these factors of shape and composition the lubricant requirements may not be very exacting, but where for some reason shape and composition are unfavorable and cannot be changed the necessity of an adequate preventative of incomplete molding becomes prominent. It has been proposed to use various substances, such as mica, talc, soapstone, and French chalk, in dealing with this problem, but none of them meet the necessities of a situation where the shape of the article or the composition are unfavorable. Before dealing with the requirements of the "lubricant", as substances of this class are somewhat inaccurately called, and the materials which I have discovered for this purpose, I believe it will be desirable to state my belief as to the cause of incomplete molding and other defects of a somewhat similar nature.

When a rubber article is placed in a mold there is always more or less air trapped between the article and the mold. If this air is allowed to escape before the shape of the article has become set by vulcanization it causes no trouble; but if it remains after this period it will never be expelled, as the flowing of the rubber has stopped, and will cause the article to fail to fill out the mold. A mold has natural vents at the juncture of the mold sections where this air may escape, and artificial vents may be drilled through the mold in critical places. It is impossible, however, to vent the entire surface of the mold; and if the rubber sets in a position to block access to the vents the entrapped air is prevented from escaping. The function of a lubricant in preventing the formation of shy articles lies in the maintenance of a pervious layer, through which air may pass to the vents between the article and the mold.

In order to be effective for this purpose the lubricant, which according to my invention is preferably in the form of a powder, must not be absorbed by the rubber until after the air has had a chance to be expelled. This property, however, necessitates the addition of another requisite for a good lubricant,—that it shall be absorbed by the rubber by the end of the cure, so that the finished article will not be discolored due to lubricant on its surface. The capability of absorption by the rubber calls for the lubricant being in a fine state of sub-division, while the particle structure must be such as to retard the absorption to the desired degree. A third requisite is that the lubricant must not agglomerate, or, in other words, must not pack together but must lie smoothly and evenly upon the article so that no discoloring patches indicating local excess of lubricant will appear in the finished product.

Closely allied to these requirements is one relating to the form of defect commonly known as "cracks". An article such as an automobile tire is built out of several pieces of rubber, such for example as the tread and sidewalls. Where these strips come together they are joined by pressure in the uncured state, but the union is not perfected until the rubber is heated during the process of vulcanization. In applying powdered lubricant to the article it collects in the gaps where this union is still imperfect. Unless the lubricant has the property above mentioned of being absorbed by the rubber its presence in these gaps will prevent their closure, and the finished article will have cracks where the different strips of rubber are not cured together.

The lubricants known to the prior art did not meet these tests. Talc and soapstone, while otherwise fairly satisfactory, tend to agglomerate, and discolor the article for that reason. That form of mica which has been used, made by pulverizing the flaky plate-like crystals of the mineral muscovite, gives fair results as far as concerns the prevention of shies; but, probably due to the very plate-like crystalline form which gives it value in that field, it does not absorb sufficiently to avoid discoloration and the formation of cracks. Other prior art lubricants have had the same or similar defects.

I have found that greatly improved results can be obtained by the use of finely ground sericite. These minerals are of the general class of micas, but lack the plate-like structure by which mica is generally recognized. On account of the lack of the plate formation they have never been thought suitable for the purpose for which I use them. These substances, when reduced to a state of fineness such as to pass through a mesh of 200 to the inch or thereabouts, serve excellently all the requirements set forth above. They are applied by dusting onto the article, and will be thoroughly absorbed by the rubber during the cure, producing no discoloration and not interfering with the thorough union of the rubber surfaces. A marked decrease in shy tires will result over what could be obtained with prior lubricants.

The commercial mineral probably contains some plate mica and other impurities, but these are so diluted by the sericite that they do not impair its efficacy. It may prove desirable to apply some of the well-known anti-sticking compounds, such as soap-bark solution, to the molds before introducing the article. This solution, if used should be thoroughly dried so as to have no water in the mold. The use of such a solution will reduce any tendency of the article to stick in the mold, but has no effect upon the formation of shy spots, which is the chief defect which my invention is intended to remedy.

Having thus described my invention, I claim:

1. A method of vulcanizing rubber articles which comprises dusting the article with finely powdered sericite, placing the article in a mold, and subjecting the article to heat and pressure.

2. A method of preparing rubber articles for vulcanization which comprises coating the article with finely powdered sericite.

3. A method of vulcanizing rubber articles which comprises dusting the article with finely powdered sericite, coating a mold with a solution of soap-bark, placing the article in the mold, and subjecting the article to heat and pressure.

CHARLES EDGAR MAYNARD.